United States Patent
Surapuram (10) Patent No.: US 9,477,484 B2
(45) Date of Patent: Oct. 25, 2016

(54) SYSTEM AND METHOD FOR BOOT ACCELERATION OF A DATA PROCESSING SYSTEM WHEREIN A NONVOLATILE MEMORY IS PRE-CONFIGURED BEFORE BOOT TIME

(71) Applicant: SAMSUNG ELECTRONICS CO., LTD., Suwon-Si, Gyeonggi-Do (KR)

(72) Inventor: Dilip Surapuram, Andhra Pradesh (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 192 days.

(21) Appl. No.: 14/293,057

(22) Filed: Jun. 2, 2014

(65) Prior Publication Data
US 2015/0033005 A1    Jan. 29, 2015

(30) Foreign Application Priority Data

Jul. 23, 2013  (IN) .............................. 3260/CHE/2013
Nov. 14, 2013  (KR) ........................ 10-2013-0138456

(51) Int. Cl.
| G06F 15/177 | (2006.01) |
| G06F 9/00 | (2006.01) |
| G06F 12/00 | (2006.01) |
| G06F 9/44 | (2006.01) |

(52) U.S. Cl.
CPC .................................. G06F 9/4401 (2013.01)

(58) Field of Classification Search
CPC ....................................................... G06F 9/4401
USPC .............................................................. 713/2
See application file for complete search history.

(56) References Cited

U.S. PATENT DOCUMENTS

| 6,807,630 | B2 * | 10/2004 | Lay et al. .......................... 713/2 |
| 7,409,537 | B2 * | 8/2008 | Tsang ................................ 713/1 |
| 7,634,585 | B2 | 12/2009 | Conley et al. |
| 7,669,044 | B2 * | 2/2010 | Fitzgerald et al. ................. 713/1 |
| 8,010,776 | B2 * | 8/2011 | Kern ................................. 713/2 |
| 8,291,149 | B2 | 10/2012 | Azuma et al. |
| 8,291,151 | B2 | 10/2012 | Sinclair |
| 8,341,311 | B1 | 12/2012 | Szewerenko et al. |
| 8,341,332 | B2 | 12/2012 | Ma et al. |
| 8,527,691 | B2 * | 9/2013 | Honda et al. ................. 711/103 |
| 8,745,363 | B2 * | 6/2014 | Sohn et al. ........................ 713/1 |
| 2006/0242398 | A1 * | 10/2006 | Fontijn et al. .................... 713/2 |
| 2007/0174602 | A1 * | 7/2007 | Kao .................................. 713/2 |
| 2009/0182962 | A1 | 7/2009 | Khmelnitsky et al. |
| 2010/0122017 | A1 * | 5/2010 | Toyama ....................... 711/103 |
| 2010/0313065 | A1 | 12/2010 | Feeley et al. |
| 2011/0231621 | A1 | 9/2011 | Liang |
| 2012/0059974 | A1 | 3/2012 | Mylavarapu |
| 2012/0290826 | A1 | 11/2012 | Radke et al. |
| 2013/0007348 | A1 | 1/2013 | Fai et al. |

* cited by examiner

*Primary Examiner* — Suresh Suryawanshi
(74) *Attorney, Agent, or Firm* — Volentine & Whitt, PLLC

(57) ABSTRACT

A system and method to reduce the boot time of a data processing system by informing a memory device to send data prior to the boot time. The data processing system includes: a host system having a host processor and host memory; and (2) the memory device. The memory device is preconfigured in advance prior to the boot time with one or more Read commands with one or more corresponding physical addresses of host memory. This preconfiguration can be done at the time of system integration or before every boot operation. Once the system power-on occurs, the memory device sends the data in packets to the host memory. Whenever the host processor needs data it will be available in host memory which significantly reduces the boot time.

20 Claims, 4 Drawing Sheets

SYSTEM AND METHOD FOR BOOT ACCELERATION OF A DATA PROCESSING SYSTEM WHEREIN A NONVOLATILE MEMORY IS PRE-CONFIGURED BEFORE BOOT TIME

CROSS-REFERENCE TO RELATED APPLICATIONS

This application is based on, and claims priorities from, Indian Patent Application No. 3260/CHE/2013, filed on Jul. 23, 2013 in the Indian Intellectual Property Office, and Korean Patent Application No. 10-2013-0138456, filed on Nov. 14, 2013 in the Korean Intellectual Property Office, the disclosure of each of which is incorporated herein in its entirety by reference.

BACKGROUND

The present invention relates to data storage and more particularly relates to reducing a boot time of a data processing system (e.g., a computer system) by informing a memory device prior to boot about data that the host wants during boot time, and one or more destination addresses of host memory to which the data has to be transferred during the boot time.

Typically, a data processing system such as a computer system includes a host system and various types of memory devices used in various combinations to provide memory for the host system. For example, the computer system can be a personal computer (PC), a laptop, a tablet computing device, or a mobile phone (e.g., a smart phone). For example, the computer system can include the host system and an external memory device coupled to the host system. The external memory device can be, for example, a flash memory device.

In general when the host system is powered on, power-on initialization sequences and Read Input Output (IO) requests are issued to a non-volatile secondary storage device to get data, such as: instructions: for a boot Loader, the kernel, and power-on Applications; metadata; graphical images, etc. A significant amount of boot time is consumed to get the data from a secondary storage device associated with the host system to a main memory from where a host processor can execute instructions. Here, the term "data" should be broadly understood to include any information which is stored in the memory device, and can include both the actual instructions of various computer programs or software routines, and application or user data (e.g., image data) which may be employed by such computer programs and software routines.

In case of computer systems such as mobile phones (e.g., smart phones), tablet computing devices, televisions, etc., in general these computer systems will boot from a fixed storage devices. At the time of booting, fixed data stored in a fixed storage device will be transferred to fixed locations of the main memory of the host processor and none of the above parameters are going to change in case of booting from memory devices.

Every time when the computer system is powered on, it does predefined steps until device comes to a state where a user can start using the computer system. In existing computer systems, at boot time, whenever the host system requires data, host software will form a read command with a Physical Region Descriptor Table (PRDT) and issue the command to a storage host controller (HCl). In turn the storage host controller will send the command to the memory device. Then the memory device reads the data from memory (e.g., a NAND array), forms a data packet, and sends it to the storage host controller.

The storage host controller transfers the data to one or more physical memory addresses of the main memory as given in the PRDT. However, the processing of the read command at boot time/post boot time will incur latency in reading from the secondary storage device on demand, thus extending the time required from power-on until the device comes to a state where a user can start using the device.

SUMMARY

Accordingly one aspect of the invention provides a host system and a nonvolatile memory device. The host system comprises: a host processor, a storage host controller, and host memory connected so as to communicate with the host processor and the storage host controller. The nonvolatile memory device is operatively connected to the storage host controller of the host system. The nonvolatile memory device is preconfigured before a boot time of the host processor with at least one preconfigured read command and at least one corresponding physical address of the host memory where read data from the nonvolatile memory device is to be transferred. The nonvolatile memory device is configured to transfer the read data to the at least one corresponding physical address of the host memory after the nonvolatile memory device processes the at least one preconfigured read command to fetch the read data during the boot time. The host processor is configured to retrieve the read data from the at least one physical address of the host memory during the boot time.

Another aspect of the invention provides a method to reduce boot time of a computer system. The method includes a host processor preconfiguring at least one read command and at least one corresponding physical address of a host memory to a nonvolatile memory device before the boot time. The method further includes the nonvolatile memory device transferring read data from the nonvolatile memory device to the at least one physical address of the host memory after the nonvolatile memory device processes the at least one read command to fetch the read data during the boot time. Further the method includes the host processor retrieving the read data in the host memory during the boot time.

Yet another aspect of the invention provides a method for a data processing system comprising a host system having a host processor, host memory, and a storage host controller, and a memory device connected to the host system by the storage host controller. The method comprises: prior to a boot time for the data processing system, preconfiguring the memory device with at least one read command and at least one corresponding physical address in the host memory to which data stored in the memory device is to be transferred; the memory device processing the at least one preconfigured read command to fetch read data from memory cells of the memory device during the boot time; transferring the read data from the memory device to the at least one corresponding physical address in the host memory via the storage host controller; and the host processor retrieving the read data from the at least one physical address of the host memory during the boot time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF THE EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Embodiments disclosed herein provide a system and method which may reduce the boot time of a computer system by informing a memory device in advance about fixed data, physical address(es), and a fixed order in which data has to be transferred to a host system at boot time. The memory device may be an internal memory device or an external memory device. For example, the internal memory device can be random access memory (RAM), and the external memory device can be a flash memory.

Throughout the description the terms "computer system" and "host system" are used interchangeably.

Throughout the description the terms "device" and "memory device" are used interchangeably.

Throughout the description the terms "host memory" and "RAM" are used interchangeably.

Throughout the description, the term "data" should be broadly understood to include any information which is stored in a memory device, and can include both the actual instructions of various computer programs or software routines which may be executed by a processor (e.g., a host processor), and application or user data (e.g., image data) which may be employed by such computer programs and software routines.

In an embodiment, the memory device can be an external memory device coupled to the host system. In some embodiments, the external memory device can be, for example, a flash memory device or other nonvolatile memory device.

In an embodiment, the memory device can be configured by a host system with Read commands with one or more physical addresses of the host memory prior to the boot time. This configuration can be completed at the time of system integration or before each boot time.

In some embodiments, upon power on, the memory device may partially initialize itself and start processing preconfigured read commands, read data from memory (e.g., a NAND array), and send data packets with physical address information and response data to a storage host controller (once the storage host controller is partially initialized).

In some embodiments, the storage host controller, on receiving data packets from the memory device, may transfer data directly to one or more configured physical addresses of host memory (main memory) without interrupting host processor.

In some embodiments, once data particular to a read command is transferred, the memory device may transfer response data to a special physical address which is configured by the host system for response data, to indicate that data is transferred. Whenever the host system wants any data from the memory device, first the host system may check the response data for that particular configured read command and serves the request from host memory instead of from memory device.

In some embodiments, the host system, based on its requirements and resources available, may configure the memory device with read commands and physical addresses in advance.

Some embodiments of a method disclosed herein may avoid multiple stages of booting. In some embodiments, the memory device may act as a co-processor and transfer data that the host system wants directly to host memory to reduce the boot time. In that case, the number of read commands sent to the memory device may be reduced or minimized, and hence become close to one way data traffic (only from the memory device to the host system).

In this case, optimizations such as configuring transmission (Tx) data lanes to reception (Rx) data lanes can be completed to transfer the boot data faster (double the speed).

In some embodiments, all read requests by the host system after booting can be redirected to the host memory where data has already been transferred by the memory device. This can be performed by a filter layer in the host system which has knowledge of all read commands and physical addresses which are configured in a memory device.

Embodiments will now be described referring to the drawings, and more particularly to FIGS. 1 through 4, where similar reference characters denote corresponding features consistently throughout the figures.

Figure 1:
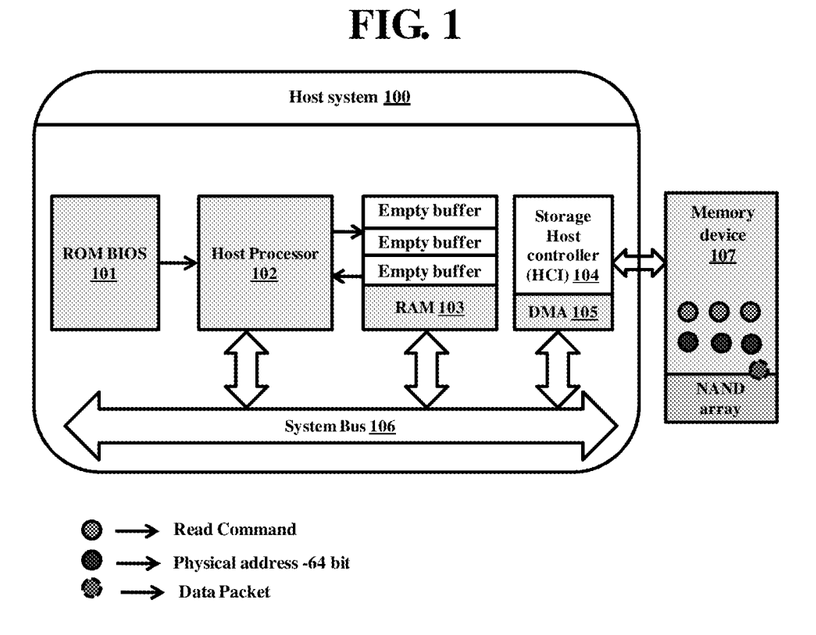
FIG. 1 illustrates an overview of a data processing system which includes a host system which is connected to a memory device, according to embodiments as disclosed herein.

FIG. 1 illustrates an overview of a data processing system which includes a host system 100 which is connected to a memory device 107, according to embodiments as disclosed herein. Host system 100 includes a Read Only Memory (ROM) BIOS 101, a host processor 102, a host Random Access Memory (RAM) 103, a storage host controller 104, and a Direct Memory Access (DMA) interface 105 with storage host controller 104. Host system 100 also includes a system bus 106 through which all the elements described above may communicate. In some embodiments, memory device 107 can be, for example, a flash memory device or other nonvolatile memory device. Memory device 107 is connected to host system 100 through storage host controller 104. Host system 100 configures one or more read commands to memory device 107 before boot time. As the boot sequence is fixed, the order in which host system 100 issues read commands to memory device 107 is also fixed. Read commands with one or more corresponding physical addresses (i.e., destination address(es) of host RAM 103) which are sent by host system 100 at boot time can be shared with memory device 107 in advance, at the time of device configuration or before each boot operation.

A physical address shared with each read command should not overlap with other addresses. The order in which read commands should be performed is also configured by host system 100 in memory device 107. Once memory device 107 is powered up, after partial initialization is completed, it will perform one or more read commands which have been preconfigured for it, in the preconfigured order, without waiting for any prompt from host system 100.

Memory device 107 fetches data from, e.g., a NAND array and forms a data packet with a physical address (i.e., a destination address of host memory) which is configured with the read command, and transfers the data packet to storage host controller 104.

Storage host controller 104 receives the packet and configures DMA 105 with the physical address and data. Data will be transferred to host memory (RAM) 103 and the same sequence is followed for other configured read commands. Execution of each read command may be attempted multiple times in case of failure. The number of attempts may be based on device configurations by host system 100.

Before storage host controller 104 performs these data transfers to host memory 103, storage host controller 104 will make sure that host memory 103 is initialized.

Once host system 100 initializes host memory 103, it can prompt storage host controller 104 to start transferring the data, or storage host controller 104 can poll for host memory initialization.

For every read command, memory device 107 will send a response which will be transferred to a special physical address (configured for responses) of host memory 103.

In the above sequence of data transfer, host processor 102 is not disturbed, even after completing each command. So, host processor 102 can continue with initialization of other peripherals. Whenever host system 100 needs data it will check the respective response (again, responses will be stored at special physical locations in host memory 103) and if the check is successful, that means that the needed data is already available in host memory 103. All the data buffers and cache in storage host controller 104 and memory device 107 can be efficiently used at boot time since data transfer will be in only one direction (from memory device 107 to host system 100), i.e., unidirectional data transfer.

Figure 2:
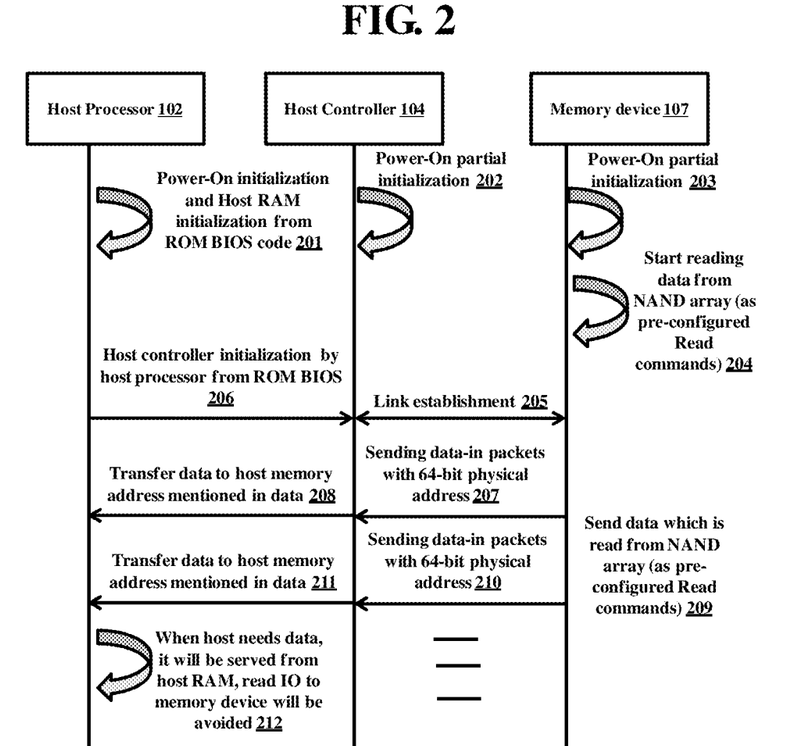
FIG. 2 is a diagram illustrating a sequence of operations in one embodiment of a process of transferring data from a memory device to host memory.

FIG. 2 is a diagram illustrating a sequence of operations in one embodiment of a process of transferring data from memory device 107 to host memory 103. In FIG. 2, the Read commands and the physical addresses to which data is to be transferred in host memory 103 are pre-configured in memory device 107. FIG. 2 depicts an example of the timing of operations of host processor 102, storage host controller 104 and memory device 107. When host system 100 is powered on, in operation (201) host processor 102 and host memory (e.g., RAM 103) initialize themselves from ROM BIOS code.

In various embodiments, the BIOS code can be executed from ROM or an internal RAM to storage host controller 104, as in the ONENAND™ concept.

Also, in operation (202) storage host controller 104 partially initializes itself, and in operation (203) memory device 107 partially initializes itself. Since the Read commands are preconfigured in memory device 107, memory device 107 can start executing the preconfigured Read commands. Accordingly, in operation (204) memory device 107 reads data from its NAND array and prepares to send the read data to storage host controller 104. Before actually transferring the read data, in operation (205) memory device 107 and storage host controller 104 establish a link. Further, in operation (206) host processor 102 completes initialization of storage host controller 104 from ROM BIOS 101. In operation (207) memory device 107 sends data in packets with a corresponding preconfigured physical address (i.e., an address in host memory 203, for example a 64-bit address) to storage host controller 104. In operation (208) storage host controller 104 transfers the data to the host memory address 103 referenced by the data. Similarly, in operation (209) memory device 107 sends additional data with a preconfigured physical address to storage host controller 104. In operation (210) memory device 107 sends data in packets with the (e.g., 64-bit) physical address of host memory 103 to storage host controller 104. In operation (211) storage host controller 104 transfers the data to the physical address in host memory 103. When host system 100 needs data, then in operation (212) host processor 102 reads the data from the host memory (RAM) 103 and this consistently reduces reading IO from memory device 107. In some embodiments, execution of each Read command may be attempted multiple times in case of failure. The number of attempts may be based on memory device 107 configurations by host system 100.

As will be described in greater detail below with respect to FIG. 4, for example, at time T0, host system 100 is powered up. Host processor 102 executes BIOS code and initializes host memory (e.g., RAM) 103 and system bus 106. In parallel, memory device 107 partially initializes itself and starts processing preconfigured read commands. At time T1, host processor 102 further executes BIOS code and initializes other peripherals or waits for data from memory device 107. In parallel, memory device 107 transfers data to host memory 103 at one or more preconfigured physical addresses, and transfers one or more responses to indicate successful data transfer.

At time T2, host processor 102 executes boot code from host memory 103 and initializes other peripherals. In parallel, memory device 107 transfers read data to host memory 103 at one or more preconfigured physical addresses, and transfers one or more responses to indicate successful data transfer.

At time T3, host processor 102 executes kernel code from host memory 103 and initializes other peripherals. In parallel, memory device 107 completes data transfer to host memory 103 at the one or more preconfigured physical addresses. All read IOs of host processor 102 are redirected to host memory 103 where data is already available using a filter layer in host system 100.

In some embodiments, host system 100 can preconfigure read commands not only for a kernel image. Once the kernel is up it wants data such as data of a file system, graphical images, and binaries of some applications and database needed for startup applications which need to be executed after host system 100 starts operating. In some embodiments, host system 100 can preconfigure Read commands for some or all of this data.

There can be two types of configurations. One type is one-time configurable Read commands for kernel code or the like, and another type is multiple times configurable Read commands for application data, metadata or the like.

In some embodiments, all the data which the host system 100 wants at power-on can be configured as read commands in memory device 107 in the order of priority.

Figure 3:
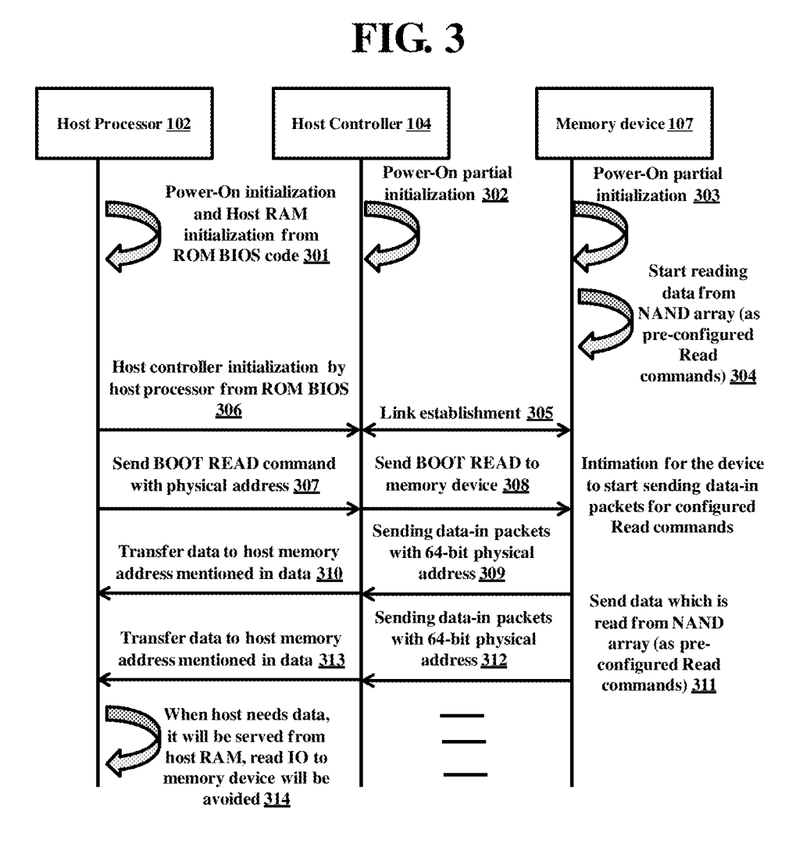
FIG. 3 is a diagram illustrating a sequence of operations in another embodiment of a process of transferring data from a memory device to host memory.

FIG. 3 is a diagram illustrating a sequence of operations in another embodiment of a process of transferring data from memory device 107 to host memory 103. In embodiments as described with respect to FIG. 3, memory device 107 is informed about the boot code (source and destination addresses) before booting. Accordingly, memory device 107 can transfer the data in advance to host memory (e.g., RAM) 103. The Read commands and data buffer offsets are configured at system integration. Instead of memory device 107 starting the data transfer, host processor 102 will send a BOOT READ command to memory device 107 as an indication to start transferring the data related to the preconfigured Read commands during the boot time. FIG. 3 depicts an example of the timing of operations of host processor 102, storage host controller 104 and memory device 107. When host system 100 is powered on, in operation 301 host processor 102 and host memory (e.g., RAM) 103 initialize themselves from ROM BIOS code. Sequentially, in operation (302) storage host controller 104 partially initializes itself, and in operation (303) memory device 107 partially initializes itself. Since the Read commands are pre-configured in memory device 107, it can start executing the preconfigured read commands. In operation (304), memory device 107 reads data from its NAND array and prepares to send the data to storage host controller 104. Before actually transferring the read data, in operation (305) memory device 107 and storage host controller 104 establish a link. Further, in operation (306) host processor 102 completes initialization of storage host controller 104 from ROM BIOS 101. In operation (307), host processor 102 sends a BOOT READ command with one or more physical addresses to storage host controller 104. In operation (308), storage host controller 104 sends the BOOT READ command to the memory device 107.

In some embodiments, the BOOT READ command is sent with a physical address table (one entry), having a Physical Base Address and a large data transfer length (for example: 500 MB).

This BOOT READ commands acts as a prompt for the memory device 107 to start sending data in packets for the preconfigured Read commands. Accordingly, in operation (309) memory device 107 data in packets with preconfigured data buffer offsets to storage host controller 104. In operation (310), storage host controller 104 transfers the data in DMA to 105 host memory 103 (as per existing protocol).

Similarly, in operation (311) memory device 107 sends additional data with a preconfigured physical address to storage host controller 104. In operation (312) memory device 107 sends the data in packets with the (e.g., 64-bit) physical address of host memory 103 to storage host controller 104. In operation (313), storage host controller 104 transfers the data to the physical address in host memory 103. When host system 100 needs data, then in operation (314) host processor 102 reads the data from the host memory (e.g., RAM) 103 and this consistently reduces reading IO from memory device 107.

As will be described in greater detail below with respect to FIG. 4, for example, at time T0, host system 100 is powered up. Host processor 102 executes BIOS code and initializes host memory (e.g., RAM) 103, system bus 106, and sends a BOOT READ command to memory device 107. Memory device 107 in response to the BOOT READ command, starts processing Read commands which are already preconfigured. The BOOT READ command is sent with the physical address table of one entry. Specifying the base physical address and a large data transfer length and for memory device 107, The BOOT READ command serves as an indication to start the data transfer for already preconfigured Read commands during the boot time.

At time T1, host processor 102 further executes BIOS code and initializes other peripherals or waits for data from memory device 107. In parallel, memory device 107 transfers data to host memory 103 at preconfigured data buffer offsets, and transfers one or more responses (in the form of Data packets) to indicate successful data transfer.

At time T2, host processor 102 executes boot code from host memory 103 and initializes other peripherals. In parallel, memory device 107 transfers data to host memory 103 at preconfigured physical address(es) (data buffer offsets) and transfers one or more responses to indicate successful data transfer.

At time T3, host processor 102 executes kernel code from host memory 103 and initializes other peripherals further. In parallel, memory device 107 completes data transfer to host memory 103 at the preconfigured physical address(es) (data buffer offsets). All Read IOs of host processor 102 are redirected to host memory 103 where data is already available.

Figure 4:
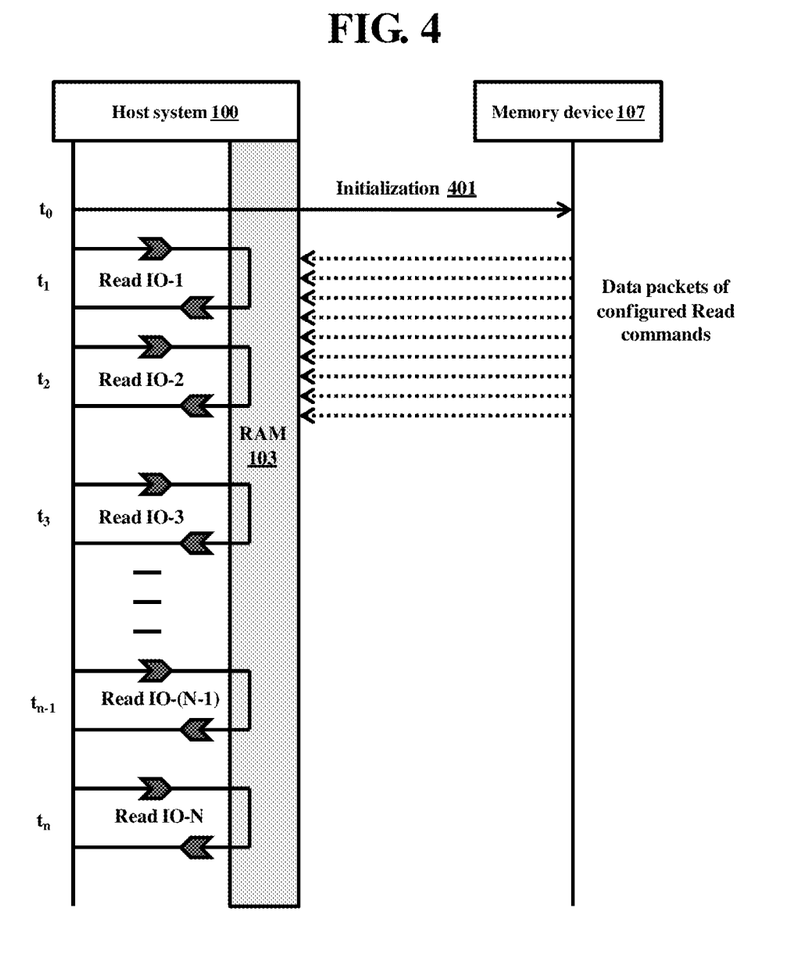
FIG. 4 is a diagram illustrating a Read operation from a memory device by a host processor, according to embodiments as disclosed herein.

FIG. 4 is a diagram illustrating a Read operation from memory device 107 by host processor 102, according to embodiments as disclosed herein. FIG. 4 depicts a sequence of operations of host system 100 and memory device 107. At time t0, in an operation (401) host system 100 initializes memory device 107. Then memory device 107 sends the data in packets of preconfigured Read commands to host memory (e.g., RAM) 103. At times t1, t2 and t3 host system 100 tries to read the data from host memory (e.g., RAM) 103. Read requests coming from upper layers of host system 100 will be redirected to host memory (e.g., RAM) 103. For example, if the Read command 2 data is already available in host memory (e.g., RAM) 103, then host processor 102 reads the Read command 2 data from host memory (e.g., RAM) 103 rather than from memory device 107.

In some embodiments, memory device 107 can pre-fetch and store data in a device cache, since it knows in advance what data it has to transfer. At the time of data transfer, host processor 102 can initialize other peripherals in parallel and whenever it needs some data from memory device 107, there is no need to send a Read IO request or command and wait for the data, because the data will be already available in host memory (e.g., RAM) 103.

For example, applications such as loading contacts in a mobile phone may execute faster because the data is already available in RAM of the mobile device.

Memory device 107 and storage host controller 104 may act as a co-processor for host processor 102 to make the booting operation significantly faster.

For example, the proposed method can be applicable to systems like Universal Flash Storage (UFS) or similar protocols where there will be a storage host controller and a memory device controller as a part of a storage system.

The embodiments disclosed herein can be implemented through at least one software program running on at least one hardware component, such as a microprocessor. Elements shown in FIGS. 1, 2, 3 and 4 include blocks which can be implemented in at least one of a hardware device, or a combination of a hardware device and a software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A data processing system; comprising:
   a host system comprising:
      a host processor,
      a storage host controller, and
      a host memory connected so as to communicate with the host processor and the storage host controller, and
   a nonvolatile memory device operatively connected to the storage host controller of the host system, wherein:
   the nonvolatile memory device is preconfigured before a boot time of the host processor with at least one preconfigured read command and at least one corresponding physical address of the host memory where read data from the nonvolatile memory device is to be transferred,
   the nonvolatile memory device is configured to transfer the read data to the at least one corresponding physical address of the host memory after the nonvolatile memory device processes the at least one preconfigured read command to fetch the read data during the boot time; and
   the host processor is configured to retrieve the read data from the at least one physical address of the host memory during the boot time.

2. The data processing system of claim 1, wherein the host processor preconfigures the nonvolatile memory device with the at least one preconfigured read command during integration of the data processing system.

3. The data processing system of claim 1, wherein the nonvolatile memory device is configured to process the at least one preconfigured read command to fetch the read data during the boot time before receiving a request from the host processor.

4. The data processing system of claim 1, wherein the host processor preconfigures the nonvolatile memory device with the at least one preconfigured read command and the at least one corresponding physical address before the boot time as an indication to the nonvolatile memory device to process the at least one preconfigured read command during the boot time.

5. The data processing system of claim 1, wherein the host processor is further configured to prompt the nonvolatile memory device to start transferring the read data through a boot read command during the boot time.

6. The data processing system of claim 1, wherein the read data is one of: boot data and data required for applications during the boot time.

7. The data processing system of claim 1, wherein the nonvolatile memory device is configured to process the at least one read command after partial initialization after power on.

8. The data processing system of claim 1, wherein:
   the nonvolatile memory device is configured to send data packets to the storage host controller after processing the at least one preconfigured read command, and
   the storage host controller is configured to transfer the data packets to the physical address of the host memory using Direct Memory Access (DMA).

9. The data processing system of claim 1, wherein:
   the nonvolatile memory device is further configured to send response data to another physical address of the host memory which is configured by the storage host processor for the response data after transferring the data packets to the host memory, and
   the response data indicates that the read data is transferred to the host memory during the boot time.

10. The data processing system of claim 9, wherein the host processor is further configured to check the response data for the at least one read command in the host memory when the host processor requires the read data from the nonvolatile memory device during the boot time.

11. The data processing system of claim 1, wherein:
   the host system is further configured to redirect a plurality of additional read commands to the host memory after the boot time using a filter layer instead of sending the additional read commands to the nonvolatile memory device, and
   the filter layer is provided with information of the plurality of read commands and corresponding physical addresses which are preconfigured in the nonvolatile memory device.

12. A method to reduce boot time of a data processing system, the method comprising:
   a host processor preconfiguring at least one read command and at least one corresponding physical address of a host memory to a nonvolatile memory device before the boot time;
   the nonvolatile memory device transferring read data from the nonvolatile memory device to the at least one physical address of the host memory after the nonvolatile memory devices processes the at least one read command to fetch the read data during the boot time; and
   the host processor retrieving the read data in the host memory by the host processor during the boot time.

13. The method of claim 12, wherein the host processor preconfigures the nonvolatile memory device with the at least one preconfigured read command during integration of a data processing system which includes the host processor, the host memory, the storage host controller and the nonvolatile memory device.

14. The method of claim 12, wherein the nonvolatile memory device processes the at least one preconfigured read command to fetch the read data during the boot time before receiving a request from the host processor.

15. The method of claim 12, further comprising:
   the nonvolatile memory device sending response data to another physical address of the host memory which is configured by the storage host processor for the response data after transferring the read data to the host memory, wherein
   the response data indicates that the read data is transferred to the host memory during the boot time.

16. A method to reduce boot time for a data processing system comprising a host system having a host processor, a host memory and a storage host controller, and a memory device connected to the host system by the storage host controller, the method comprising:

prior to a boot time for the data processing system, preconfiguring the memory device with at least one read command and at least one corresponding physical address in the host memory to which data stored in the memory device is to be transferred;

the memory device processing the at least one preconfigured read command to fetch read data from memory cells of the memory device during the boot time;

transferring the read data from the memory device to the at least one corresponding physical address in the host memory via the storage host controller; and the host processor retrieving the read data from the at least one physical address of the host memory during the boot time.

17. The method of claim 16, comprising transferring the read data from the memory device to the at least one corresponding physical address in the host memory via the storage host controller prior to any read command of the host processor being sent to the memory device during the boot time.

18. The method of claim 16, comprising transferring the read data from the memory device to the at least one corresponding physical address in the host memory via the storage host controller after the host processor generates a boot read command during the boot time which prompts the nonvolatile memory device to start transferring the read data during the boot time.

19. The method of claim 16, further comprising preconfiguring the nonvolatile memory device with the at least one preconfigured read command during integration of the data processing system.

20. The method of claim 16, further comprising:

the nonvolatile memory device sending response data to another physical address of the host memory which is configured by the storage host processor for the response data after transferring the read data to the host memory, wherein the response data indicates that the read data is transferred to the host memory during the boot time.

* * * * *